United States Patent
Youn et al.

(10) Patent No.: US 11,152,601 B2
(45) Date of Patent: Oct. 19, 2021

(54) METHOD FOR MANUFACTURING LITHIUM ELECTRODE

(71) Applicant: LG CHEM, LTD., Seoul (KR)

(72) Inventors: Suk Il Youn, Daejeon (KR);
Byoungkuk Son, Daejeon (KR);
Junghun Choi, Daejeon (KR);
Minchul Jang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/467,200

(22) PCT Filed: Jul. 4, 2018

(86) PCT No.: PCT/KR2018/007576
§ 371 (c)(1),
(2) Date: Jun. 6, 2019

(87) PCT Pub. No.: WO2019/022402
PCT Pub. Date: Jan. 31, 2019

(65) Prior Publication Data
US 2019/0319255 A1 Oct. 17, 2019

(30) Foreign Application Priority Data
Jul. 26, 2017 (KR) .......................... 10-2017-0094480

(51) Int. Cl.
*H01M 4/04* (2006.01)
*H01M 4/1395* (2010.01)
*H01M 4/66* (2006.01)

(52) U.S. Cl.
CPC ....... *H01M 4/0428* (2013.01); *H01M 4/1395* (2013.01); *H01M 4/662* (2013.01)

(58) Field of Classification Search
CPC ................................................... B05D 3/142
See application file for complete search history.

(56) References Cited

U.S. PATENT DOCUMENTS

| | | | |
|---|---|---|---|
| 6,214,061 B1 | 4/2001 | Visco et al. |
| 2005/0079420 A1 | 4/2005 | Cho et al. |
| 2010/0086851 A1 | 4/2010 | Wang et al. |
| 2014/0057057 A1 | 2/2014 | Terai et al. |
| 2015/0295246 A1 | 10/2015 | Son et al. |
| 2016/0380314 A1 | 12/2016 | Yang et al. |
| 2017/0062829 A1 | 3/2017 | Ryu et al. |

FOREIGN PATENT DOCUMENTS

| | | | |
|---|---|---|---|
| CN | 103560164 A | | 2/2014 |
| CN | 103560162 B | | 2/2017 |
| JP | 2007-265733 A | | 10/2007 |
| JP | 2007-273459 A | | 10/2007 |
| JP | 2008-146899 A | | 6/2008 |
| JP | 2013-020974 A | | 1/2013 |
| JP | 2013020974 A | * | 1/2013 |
| JP | 2013-91278 A | | 5/2013 |
| JP | 5269692 B2 | | 8/2013 |
| JP | 2014-205731 A | | 10/2014 |
| JP | 2016-527679 A | | 9/2016 |
| KR | 10-2001-0043145 A | | 5/2001 |
| KR | 10-2005-0019483 A | | 3/2005 |
| KR | 10-0635684 B1 | | 10/2006 |
| KR | 10-2014-0105695 A | | 9/2014 |
| KR | 10-2015-0101808 A | | 9/2015 |
| KR | 10-2016-0037488 A | | 4/2016 |
| KR | 10-2016-0037610 A | | 4/2016 |
| KR | 20160037488 A | * | 4/2016 |
| KR | 10-2017-0001069 A | | 1/2017 |
| KR | 10-2017-0026098 A | | 3/2017 |
| WO | WO 99/57770 A1 | | 11/1999 |
| WO | WO-2015019063 A1 | * | 2/2015 ............. B05D 3/144 |

OTHER PUBLICATIONS

SYSCO-300N, retrieved from https://www.alibaba.com/product-detail/Corona-Surface-Treatment-System_111437930.html?spm=a2700.galleryofferlist.0.0.615a1d66IT56ig on Mar. 29, 2020 (Year: 2020).*
System Korea. "Atmospheric Plasma Corona Treatment System", retrieved from https://www.tradekorea.com/product/detail/P378910/Atmospheric-Plasma---Corona-Treatment-System.html?minisiteprodgroupno= on Mar. 29, 2020 (Year: 2020).*
International Search Report for PCT/KR2018/007576 (PCT/ISA/210) dated Feb. 18, 2019, with English translation.
Extended European Search Report dated Mar. 2, 2020, for European Application No. 18838712.0.

* cited by examiner

*Primary Examiner* — Jose I Hernandez-Kenney
(74) *Attorney, Agent, or Firm* — Birch, Stewart, Kolasch & Birch, LLP

(57) ABSTRACT

A method for manufacturing a lithium electrode, more particularly, a method for manufacturing a lithium electrode having a thin and uniform thickness by, when manufacturing the lithium electrode, first forming a protective layer capable of protecting lithium metal on the surface treated substrate with a plasma and corona process, and depositing lithium metal on the protective layer and then transferring the deposited lithium metal layer to a current collector. The energy density of the lithium secondary battery manufactured using the lithium electrode thus manufactured can be improved.

10 Claims, 2 Drawing Sheets

[Figure 1]
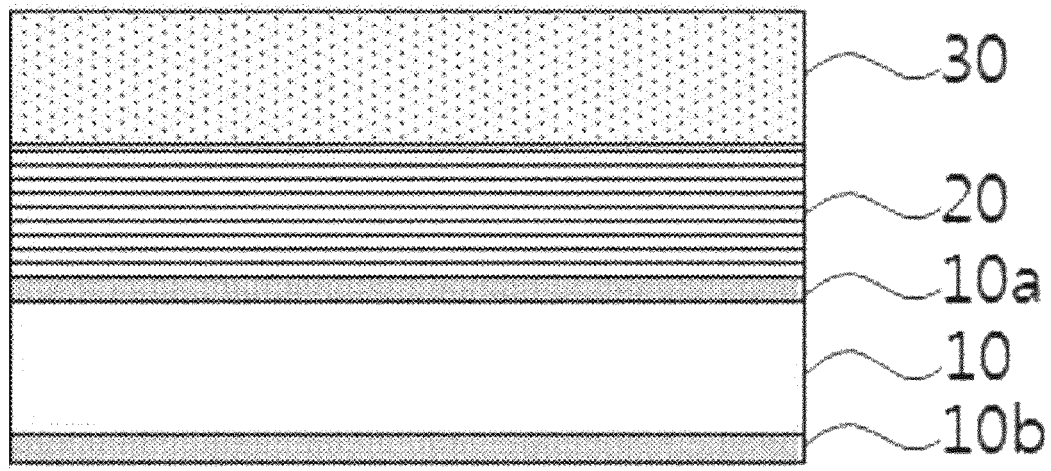
[Figure 2]
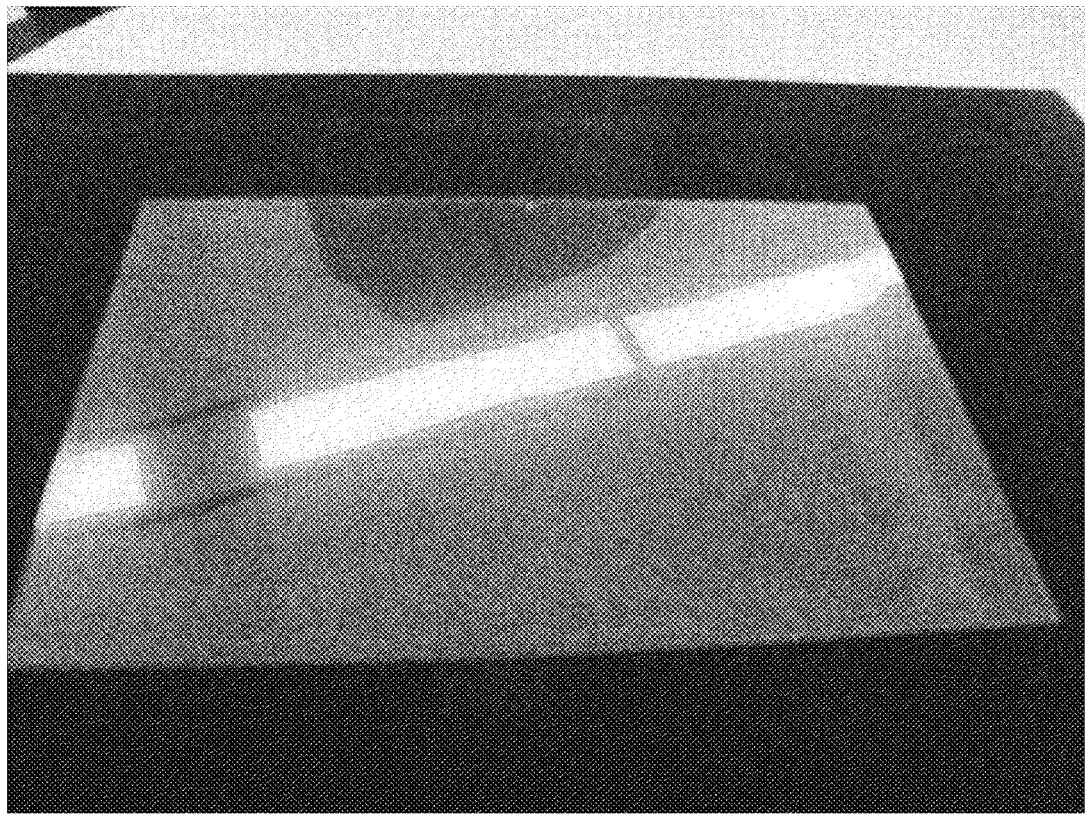

【Figure 3】
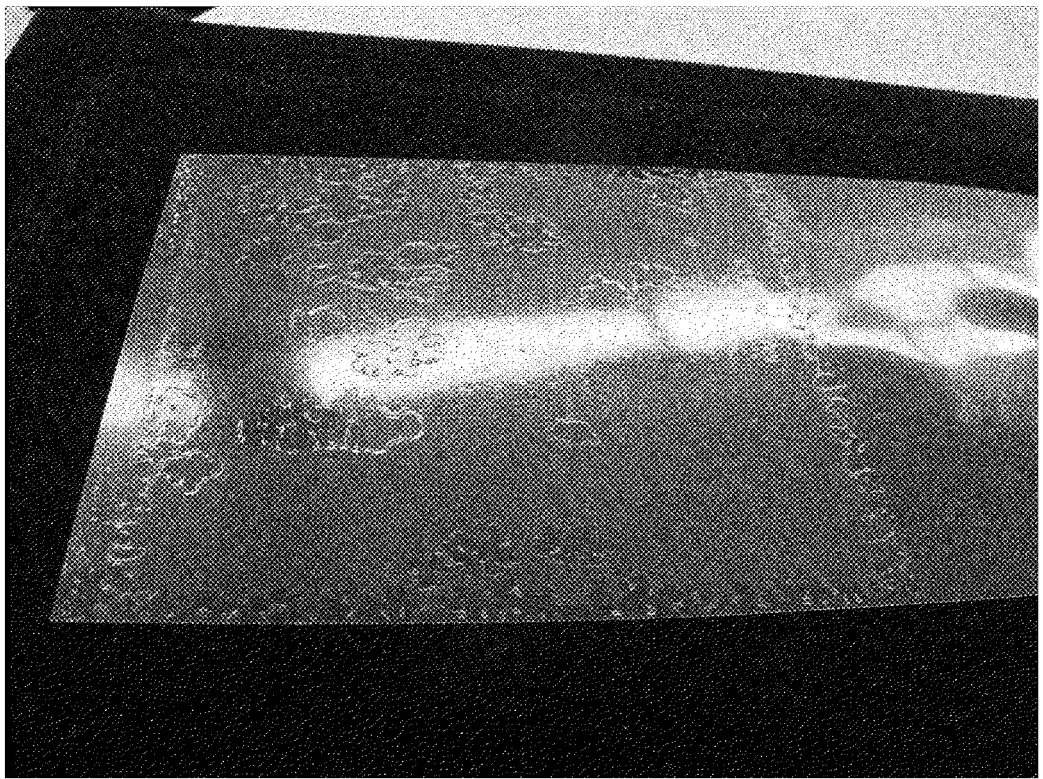
【Figure 4】
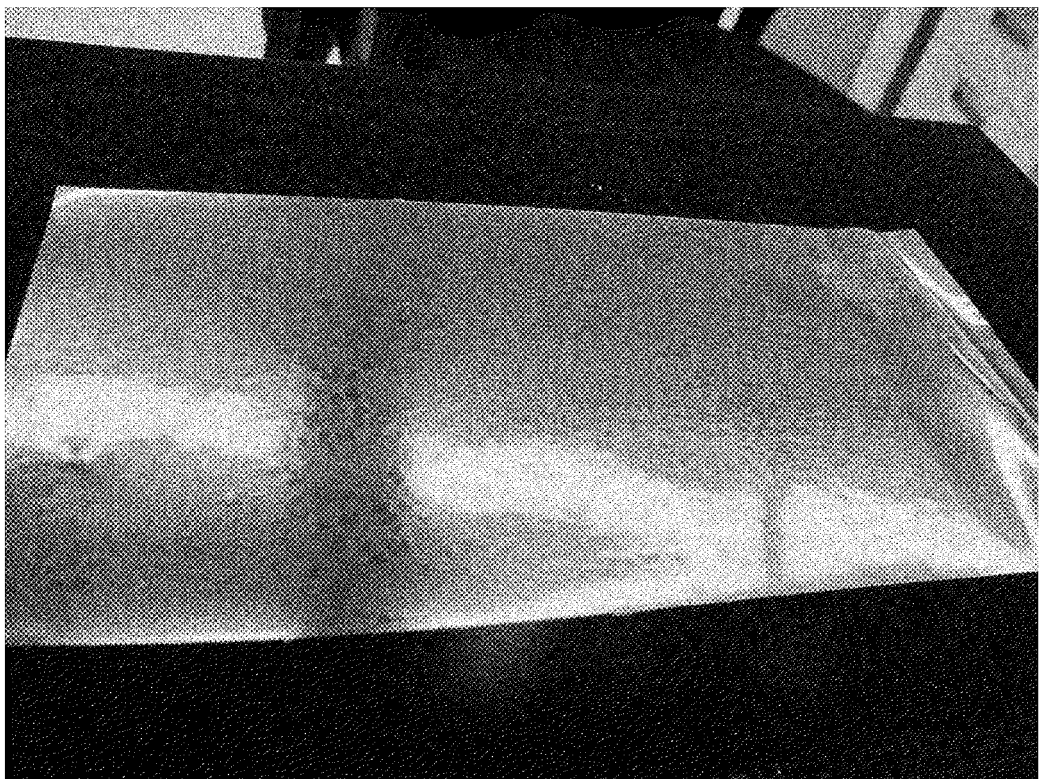

METHOD FOR MANUFACTURING LITHIUM ELECTRODE

TECHNICAL FIELD

This application claims the benefit of priority based on Korean Patent Application No. 10-2017-0094480, filed on Jul. 26, 2017, the entire contents of which are incorporated herein by reference.

The present invention relates to a method of manufacturing a lithium electrode.

BACKGROUND ART

Until recently, there has been considerable interest in developing batteries with high energy density using lithium as a negative electrode. For example, as compared to other electrochemical systems with a lithium inserted carbon negative electrode and a nickel or cadmium electrode that increase the weight and volume of the negative electrode due to the presence of the non-electroactive material, thereby reducing the energy density of the battery, since lithium metal has the characteristics of low weight and high capacity, it attracts much attention as an active material of negative electrode of electrochemical battery. A lithium metal negative electrode or a negative electrode mainly comprising lithium metal provides an opportunity to construct a battery that is lighter and has a higher energy density than a battery such as a lithium-ion, nickel metal hydride or nickel-cadmium battery. These features are highly desirable for batteries for portable electronic devices such as cell phones and lab-top computers, where the premium is compromised with a low weighted value.

Conventional lithium ion batteries have an energy density of 700 wh/l by using graphite in the negative electrode and lithium cobalt oxide (LCO) in the positive electrode. However, recently, since the fields requiring high energy density are expanding, there is a continuing need to increase the energy density of lithium ion batteries. For example, it is necessary to increase the energy density even in order to increase the travel distance of the electric vehicle at the time of one charge to 500 km or more.

In order to increase the energy density of lithium ion batteries, the use of a lithium electrode has been increasing. However, lithium metal is a metal that has high reactivity and is difficult to handle, which is a problem that it is difficult to handle in the process.

In order to solve such problems, various attempts have been made in order to manufacture an electrode using lithium metal.

For example, Korean Patent No. 0635684 relates to a method of forming a lithium electrode having a glass protective layer and proposes a method of forming the lithium electrode which comprises forming the protective layer on a substrate (PET) on which a layer of the release agent is deposited and depositing lithium on the protective layer and then depositing a current collector on the lithium. However, during the deposition of lithium, the surface of lithium is exposed and thus the thickness of the oxidized layer (native layer) is increased, which may adversely affect the life characteristics of the battery.

Therefore, in the manufacture of lithium electrodes, there is a continuing need to develop a method for manufacturing a lithium electrode with a thin and uniform thickness by minimizing the formation of the oxidized layer by protecting lithium from moisture and external air.

PRIOR ART LITERATURE

Patent Literature (Patent Literature 1) Korean Patent No. 0635684, "ENCAPSULATED LITHIUM ELECTRODES HAVING GLASSPROTECTIVE LAYERS AND METHOD FOR THEIR PREPARATION" and (Patent Literature 2) Korean Patent Laid-open Publication No. 2017-0026098, "Lithium metal battery including lithium metal anode, method of protecting the lithium metal anode, and protective layer prepared according to the method."

DISCLOSURE

Technical Problem

As a result of various studies to solve the above problems, the inventors of the present invention have confirmed that a lithium electrode having a thin and uniform thickness can be manufactured by, when manufacturing the lithium electrode, treating the surface of the substrate with plasma and corona, and then first forming a protective layer capable of protecting lithium metal and depositing lithium metal on the protective layer and then transferring to a Cu current collector, and that the energy density of the lithium secondary battery manufactured using the lithium electrode thus manufactured is improved.

Therefore, it is an object of the present invention to provide a lithium electrode having a uniform and thin thickness by minimizing the formation of the oxidized layer.

In addition, it is another object of the present invention is to manufacture a lithium electrode having a uniform and thin thickness by preventing the exposure of lithium metal to moisture and outside air during the manufacturing process, thereby minimizing the formation of the oxidized layer on the surface of lithium metal.

Technical Solution

In order to achieve the above object, the present invention provides a method of manufacturing a lithium electrode, comprising the following steps of, (S1) surface-treating a first surface of a substrate by a plasma and corona process;

(S2) coating a polymer for protecting lithium metal on the surface-treated substrate to form a protective layer;

(S3) depositing lithium metal on the protective layer to form a lithium metal layer; and (S4) transferring the lithium metal layer with the protective layer to a current collector.

The plasma and corona process can be performed at a power of 0.6 kW or more and less than 1.5 Kw.

The substrate may include at least one selected from the group consisting of polyethylene terephthalate (PET), polyimide (PI), poly(methylmethacrylate) (PMMA), cellulose tri-acetate (TAC), polypropylene, polyethylene, and polycarbonate.

The substrate may have a release layer formed on at least the first surface thereof.

The release layer may comprise at least one selected from the group consisting of Si, melamine, and fluorine.

At least the first surface of the substrate a be coated with an oligomer block coating.

The deposition may be performed by a method selected from the group consisting of evaporation deposition, chemical vapor deposition (CVD), and physical vapor deposition.

The thickness of the lithium metal layer may be between 5 µm and 50 µm.

The protective layer may comprise at least one selected from the group consisting of polyvinylidene fluoride (PVDF), polyvinylidene fluoride-hexafluoroethylene copolymer, cycloolefin copolymer, and styrene butadiene rubber-carboxymethyl cellulose (SBR-CMC).

The current collector may include any one selected from the group consisting of copper, aluminum, nickel, titanium, sintered carbon, and stainless steel.

The lithium electrode comprises the current collector; lithium metal layer formed on the current collector; and the protective layer formed on the lithium metal layer.

Advantageous Effects

According to the present invention, a lithium electrode in which a current collector, a lithium metal layer and a protective layer are sequentially stacked can be manufactured by a method of depositing lithium metal on a lithium metal protective layer and then transferring it to the current collector to form the lithium electrode.

In addition, a lithium electrode having a thin and uniform thickness can be manufactured by preventing the exposure of lithium metal to external environments such as moisture and outside air during the manufacturing process, thereby minimizing the formation of the oxidized layer on the surface of lithium metal.

In addition, since a method of forming the lithium metal layer on the current collector by transfer without directly depositing lithium metal on the current collector, it is possible to compensate the problem of the current collector, which is liable to break during the deposition process, and thus a lithium electrode can be manufactured using various kinds of current collectors.

DESCRIPTION OF DRAWINGS

FIG. 1 is a schematic view showing a lithium electrode laminate before transfer to a current collector in a lithium electrode manufacturing process according to the present invention.

FIG. 2 is a photograph showing a state after forming a protective layer on a substrate treated with plasma and corona according to Example 1 of the present invention.

FIG. 3 is a photograph showing a state after forming a protective layer on a substrate treated with plasma and corona according to Comparative Example 1 of the present invention.

FIG. 4 is a photograph showing a state after forming a protective layer on a substrate treated with plasma and corona according to Comparative Example 2 of the present invention.

BEST MODE

Hereinafter, the present invention will be described in detail in order to facilitate understanding of the present invention.

The terms and words used in the present specification and claims should not be construed as limited to ordinary or dictionary terms and should be construed in a sense and concept consistent with the technical idea of the present invention, based on the principle that the inventor can properly define the concept of a term to describe his invention in the best way possible.

Method for Manufacturing Lithium Electrode

The present invention relates to a method of manufacturing a lithium electrode capable of increasing the energy density of a battery, which comprises the following steps of, (S1) surface-treating one surface of the substrate by a plasma and corona process;

(S2) coating a polymer for protecting lithium metal on the surface-treated substrate to form a protective layer;

(S3) depositing lithium metal on the protective layer to form a lithium metal layer; and (S4) transferring the lithium metal layer to a current collector.

FIG. 1 is a schematic view showing a lithium electrode laminate before transfer to a current collector in a lithium electrode manufacturing process according to the present invention.

Referring to FIG. 1, the lithium electrode can be manufactured by sequentially forming a protective layer 20 and a lithium metal layer 30 on a substrate 10 having release layers 10a and 10b formed on both surfaces thereof and then transferring the lithium metal layer 30 to the current collector Hereinafter, the present invention will be described in more detail.

Step (S1)

In step (S1), one surface of the substrate may be surface-treated by a plasma and corona process.

In general, it is not easy to coat PVdF-HFP for forming a protective layer on a substrate, for example, on a PET on which a release layer is formed. The coating is performed after preparing the coating solution by dissolving 5 to 10 wt. % of PVdF-HFP resin in one or more organic solvents selected from the group consisting of organic solvents such as acetone, DMF (dimethyl formamide) and NMP (N-methyl-2-pyrrolidone). Since acetone has a boiling point (b.p) of 56° C. and has a very fast volatilization rate, the applicable coating process is very limited. Therefore, it is applicable only in the case of a process such as a slot-die coating in which the time for the coating solution to contact the atmosphere is extremely small.

However, acetone has a surface tension of 25.2 mN/m (at 20° C.) and thus has an advantage of spreading easily on PET on which the release layer is formed. Therefore, it is easy to coat without any treatment and it is also easy to dry because of the low boiling point In addition, DMF and NMP have boiling points of 153° C. and 202° C., respectively, so they are easily applicable to various coating processes such as bar coating, micro-gravure coating and roll coating which exhibit a long contact time between the coating solution and atmosphere.

In the present invention, particularly, NMP may be used as a solvent for the preparation of a coating solution for forming a protective layer. However, since the surface tension of NMP is 40.8 mN/m (at 20° C.), there is a problem that the wettability is poor on the release PET, so that it is not well coated.

Therefore, when coating PVdF-HFP dissolved in NMP, it is absolutely necessary to surface-treat the release surface of the release PET film by corona treatment or plasma treatment.

In the present invention, the plasma and corona process can be performed with a power of 0.6 kW or more and less than 1.5 kW.

In the plasma and corona process, if the power is less than 0.6 kW, since there is no enough time to apply substrate to plasma and corona treatment, the coating of the protective layer cannot be performed smoothly. If the power is more than 1.5 Kw, the transferring process may not be performed well.

Therefore, it is preferable to perform the plasma and corona process within the power range as described above in order to smoothly coat the protective layer on the substrate without any defects Step (S2)

In step (S2), a protective layer for protecting lithium metal may be formed by coating a polymer for protecting the lithium metal on the surface-treated substrate.

The substrate may be one having characteristics that can withstand the process conditions such as high temperature in the step of depositing lithium metal and can prevent a reverse detachment problem that the lithium metal layer is transferred to the substrate rather than the current collector during the winding process for transferring the deposited lithium metal layer to the current collector.

For example, the substrate may be at least one selected from the group consisting of polyethylene terephthalate (PET), polyimide (PI), poly(methylmethacrylate) (PMMA), cellulose tri-acetate (TAC), polypropylene, polyethylene and polycarbonate.

In addition, the substrate may have a release layer formed on at least one surface thereof, preferably release layers formed on both surfaces thereof. By the release layer, the reverse detachment problem that the lithium metal layer is transferred to the substrate rather than the current collector during the winding process for transferring the deposited lithium metal layer to the current collector can be prevented, and also after transferring the lithium metal layer onto the current collector, the substrate can be easily separated.

The release layer may comprise at least one selected from the group consisting of Si, melamine, and fluorine.

The release layer may be formed by a coating method, and the coating method may be, for example, but is not limited to, a method selected from the group consisting of dip coating, spray coating, spin coating, die coating, and roll coating, and various coating methods that can be used to form the coating layer in the art can be used.

In addition, the substrate may include an oligomer block coating formed on at least one surface thereof. At this time, the oligomer block coating means a blocking layer for preventing the migration of the oligomer that remains in the substrate without being polymerized and then escapes to the outside of the substrate to contaminate the lithium.

For example, the oligomer without being polymerized may be present in the inside of the PET film and these oligomers can move to the outside of the PET film to contaminate the lithium. Therefore, in order to prevent this, an oligomer block coating may be formed on at least one surface of the PET film.

In addition, the lower the content of the oligomer in the substrate, the more advantageous it can be. That is because the problem of oligomer escaping from the substrate can be prevented.

Step (S3)

In step (S3), a lithium metal layer may be formed by depositing lithium metal on the protective layer.

In the present invention, the protective layer may minimize the formation of the oxidized layer (native layer) on the surface by protecting lithium metal from external environments such as moisture or outside air in a series of processes for manufacturing lithium electrodes.

Therefore, the material for forming the protective layer should have high blocking performance against moisture, stability to the electrolyte, high wettability for the electrolyte, and good oxidation/reduction stability.

For example, the protective layer may comprise at least one selected from the group consisting of polyvinylidene fluoride (PVDF), polyvinylidene fluoride-hexafluoroethylene copolymer, cycloolefin polymer, cycloolefin copolymer, and styrene butadiene rubber-carboxymethyl cellulose (SBR-CMC).

The thickness of the protective layer may be in the range of 0.1 μm to 1.0 μm, preferably 0.3 μm to 0.8 μm, more preferably 0.4 μm to 0.6 μm. If the thickness of the protective layer is less than the above range, the function of exposing lithium metal from moisture or outside air may be deteriorated. If the thickness exceeds the above range, the lithium electrode to be manufactured may become thick.

The coating solution for forming the protective layer can be prepared by dissolving the above-mentioned polymer in a solvent. At this time, the concentration of the coating solution may be 1% to 20%, preferably 3% to 10%, more preferably 4% to 8%. If the concentration of the coating solution is less than the above range, the viscosity is very low and thus it is difficult to advance the coating process. If the concentration exceeds the above range, the viscosity may be high and it may be difficult to form the coating layer with the desired coating thickness. At this time, examples of the solvent for forming the coating solution may be at least one selected from the group consisting of N-methyl-2-pyrrolidone (NMP), dimethyl formamide (DMF), dimethyl acetamide (DMAc), tetramethyl urea, dimethyl sulfoxide (DMSO), and triethyl phosphate. In particular, when using NMP, the solubility of the polymer for forming the protective layer as described above is high and it may be advantageous to form the protective layer by the coating process.

In addition, the coating method for forming the protective layer may be, but is not limited to, a method selected from the group consisting of dip coating, spray coating, spin coating, die coating, roll coating, slot-die coating, bar coating, gravure coating, comma coating, curtain coating and micro-gravure coating, and various coating methods that can be used to form the coating layer in the art can be used.

In the present invention, the lithium metal layer formed on the protective layer by vapor deposition may have a thickness of 5 μm to 25 μm, preferably 10 μm to 20 μm, more preferably 13 μm to 18 μm. The thickness of the lithium metal layer may be varied depending on the application. When using only lithium metal as an electrode, for example, a negative electrode material, the thickness of the lithium metal layer is sufficient for the range of 20 μm to 25 μm. When using lithium metal as a material to compensate for the irreversibility generated from the negative electrode of the silicone oxide material, the thickness of the lithium metal layer may be about 5 μm to 15 μm. If the thickness of the lithium metal layer is less than the above range, the capacity and life characteristic of the battery may be deteriorated. If the thickness of the lithium metal layer exceeds the above range, the thickness of the lithium electrode to be manufactured may become thick, which may be detrimental to commercialization.

In the present invention, the deposition method for depositing lithium metal may be, but is not limited to, one selected from evaporation deposition, chemical vapor deposition, chemical vapor deposition (CVD), and physical vapor deposition, and the deposition methods used in the art can be variously used.

Step (S4)

In step (S4), the lithium metal layer may be transferred to the current collector. At this time, the transfer may be performed by winding a structure formed by sequentially laminating the substrate, the protective layer, and the lithium metal layer, and transferring the lithium metal layer onto the current collector using a device such as a roll press.

In the present invention, the current collector may be any one selected from the group consisting of copper, aluminum, nickel, titanium, sintered carbon, and stainless steel.

When directly depositing lithium metal on the current collector, in particular, when directly depositing lithium metal on the copper current collector, there is a problem that the copper current collector is easily broken. However, in the case of the present invention, since the lithium electrode is manufactured by forming the lithium metal layer and then transferring the lithium metal layer itself onto the current collector, a variety of current collectors can be used to manufacture the lithium electrode.

According to the manufacturing method of the lithium electrode as described above, the lithium electrode formed by sequentially laminating the current collector, the lithium metal layer, and the protective layer can be manufactured by using a method of depositing lithium metal on the lithium metal protective layer and then transferring it to the current collector to manufacture the lithium electrode.

In addition, the lithium electrode having a thin and uniform thickness can be manufactured by preventing lithium metal from exposing to the external environments such as moisture and outside air by the protective layer during the manufacturing process, thereby minimizing the formation of an oxidized layer (native layer) on the surface of lithium metal.

In addition, since the lithium metal layer is formed on the current collector by the transfer without directly depositing lithium metal on the current collector, it is possible to compensate for the problem of the current collector, which is liable to break during the deposition process, and thus the lithium electrode can be manufactured using various kinds of current collectors.

In addition, the lithium electrode thus manufactured has a thin thickness and also an excellent thickness uniformity, which can greatly improve the energy density when applied to a battery.

Hereinafter, preferred examples of the present invention will be described in order to facilitate understanding of the present invention. It will be apparent to those skilled in the art, however, that the following examples are only illustrative of the present invention and that various changes and modifications can be made within the scope and spirit of the present invention. Such variations and modifications are within the scope of the appended claims The following examples and comparative examples were carried out by changing the plasma and corona power as shown in Table 1.

TABLE 1

|  | Plasma and corona power |
| --- | --- |
| Example 1 | 0.6 kW |
| Example 2 | 1.0 kW |
| Comparative Example 1 | 0.3 kW |
| Comparative Example 2 | 0.5 kW |
| Comparative Example 3 | 1.5 kW |

Example 1

A release PET film (RX12G 50 μM, SKC Haas) having release layers on both surfaces was prepared as a substrate.

One surface of the substrate was surface-treated with plasma and corona at a power of 0.6 kW using an atmospheric pressure plasma and corona processor (SYSCO-300N, Systemkorea)

A PVDF-HFP coating solution was prepared as a coating solution for forming the protective layer for protecting lithium metal on one surface of the above surface-treated substrate. The PVDF-HFP coating solution was prepared by dissolving PVDF-HFP (LBG Grade, Arkema) in NMP solvent to produce a 5% solution The PVDF-HFP coating solution was coated on one surface of the release PET film in the thickness of 2 μm using a micro-gravure coater to form a PVDF-HFP protective layer.

A lithium metal layer having a thickness of 20 μm was formed by depositing lithium metal on the protective layer by evaporation deposition at a temperature of 600° C. and a structure formed by sequentially laminating the release PET film, the PVDF-HFP protective layer and the lithium metal layer was wound at a speed of 1 m/min.

Thereafter, the lithium metal layer was transferred onto a Cu current collector using a roll press machine (Calendering machine CLP-1015, CIS) and thus a lithium electrode in which the lithium current collector, the lithium metal layer, and the PVDF-HFP protective layer were sequentially laminated was manufactured.

Example 2

The same procedure as in Example 1 was carried out, except that the surface of the substrate was treated with plasma and corona at a power of 1.0 kW.

Comparative Example 1

The same procedure as in Example 1 was carried out, except that the surface of the substrate was treated with plasma and corona at a power of 0.3 kW.

Comparative Example 2

The same procedure as in Example 1 was carried out, except that the surface of the substrate was treated with plasma and corona at a power of 0.5 kW.

Comparative Example 3

The same procedure as in Example 1 was carried out, except that the surface of the substrate was treated with plasma and corona at a power of 1.5 kW.

Experimental Example 1: Comparison of Prepared Lithium Electrode

The lithium electrodes manufactured in Examples 1 and 2 and Comparative Examples 1 and 2 respectively were visually observed.

As a result, it can be seen that in Comparative Examples 1 and 2, the coatings of the protective layer were not smooth, whereas in Examples 1 and 2, smooth and defect-free protective layers were formed.

Meanwhile, in the case of Comparative Example 3, the coating of the protective layer itself was made smoothly, but the transferring process was not performed smoothly, so that the lithium electrode could not be manufactured normally In the above description, although the present invention has been described with reference to the limited examples and drawings, it is to be understood that various modifications and variations can be made within the scope of the technical idea of the present invention and the equivalent scope to the claims to be made below, by those skilled in the art.

DESCRIPTION OF SYMBOLS

10: Substrate
10a, 10b: Release layer
20: Protective layer
30: Lithium metal layer

The invention claimed is:

1. A method of manufacturing a lithium electrode, comprising the following steps of:
   (S1) surface-treating a first surface of a substrate by a plasma process and corona process at atmospheric pressure;
   (S2) coating a polymer solution comprising polyvinylidene fluoride-hexafluoropropylene copolymer with N-methyl-2-pyrrolidone as a solvent for protecting lithium metal on the surface-treated substrate to form a protective layer;
   (S3) depositing lithium metal on the protective layer to form a lithium metal layer; and
   (S4) transferring the lithium metal layer with the protective layer to a current collector,
   wherein the plasma and corona process is performed at a power of 0.6 kW or more and less than 1.5 kW.

2. The method of manufacturing the lithium electrode according to claim 1, wherein the substrate comprises at least one selected from the group consisting of polyethylene terephthalate (PET), polyimide (PI), poly(methylmethacrylate) (PMMA), cellulose tri-acetate (TAC), polypropylene, polyethylene and polycarbonate.

3. The method of manufacturing the lithium electrode according to claim 1, wherein the substrate has a release layer formed on at least the first surface thereof.

4. The method of manufacturing the lithium electrode according to claim 3, wherein the release layer comprises at least one selected from the group consisting of Si, melamine and fluorine.

5. The method of manufacturing the lithium electrode according to claim 1, wherein at least the first surface of the substrate is coated with oligomer block coatings.

6. The method of manufacturing the lithium electrode according to claim 1, wherein the deposition is performed by a method selected from the group consisting of evaporation deposition, chemical vapor deposition (CVD) and physical vapor deposition.

7. The method of manufacturing the lithium electrode according to claim 1, wherein the lithium metal layer has a thickness of 5 μm to 50 μm.

8. The method of manufacturing the lithium electrode according to claim 1, wherein the protective layer further comprises at least one selected from the group consisting of polyvinylidene fluoride (PVDF), cycloolefin polymer, and styrene butadiene rubber-carboxymethyl cellulose (SBR-CMC).

9. The method of manufacturing the lithium electrode according to claim 1, wherein the current collector comprises one selected from the group consisting of copper, aluminum, nickel, titanium, sintered carbon, and stainless steel.

10. The method of manufacturing the lithium electrode according to claim 1, wherein the lithium electrode comprises
    the current collector;
    the lithium metal layer formed on the current collector; and
    the protective layer formed on the lithium metal layer.

* * * * *